(12) United States Patent
Smith et al.

(10) Patent No.: US 10,983,751 B2
(45) Date of Patent: Apr. 20, 2021

(54) MULTI-APPLICATION AUGMENTED REALITY AUDIO WITH CONTEXTUALLY AWARE NOTIFICATIONS

(71) Applicant: Bose Corporation, Framingham, MA (US)

(72) Inventors: Matthew Christopher Smith, Needham Heights, MA (US); Ilissa Brooke Bruser, Framingham, MA (US); Maya Antara Mukhopadhaya, Brookline, MA (US); DonPaul Nogueira, Southborough, MA (US)

(73) Assignee: BOSE CORPORATION, Framingham, MA (US)

( * ) Notice: Subject to any disclaimer, the term of this patent is extended or adjusted under 35 U.S.C. 154(b) by 8 days.

(21) Appl. No.: 16/511,381

(22) Filed: Jul. 15, 2019

(65) Prior Publication Data

US 2021/0019109 A1    Jan. 21, 2021

(51) Int. Cl.
*G06F 3/16* (2006.01)
*H04R 1/10* (2006.01)

(52) U.S. Cl.
CPC ........... *G06F 3/165* (2013.01); *H04R 1/1041* (2013.01)

(58) Field of Classification Search
CPC ............................. G06F 3/165; H04R 1/1041

USPC ............................................... 381/56, 58, 74
See application file for complete search history.

(56) References Cited

U.S. PATENT DOCUMENTS

| | | | |
|---|---|---|---|
| 9,171,546 B1 | 10/2015 | Pike | |
| 9,451,584 B1* | 9/2016 | Cosenza | ................. H04L 51/00 |
| 2013/0194164 A1 | 8/2013 | Sugden et al. | |
| 2015/0208166 A1 | 7/2015 | Raghuvanshi et al. | |
| 2015/0230022 A1 | 8/2015 | Sakai et al. | |
| 2016/0286316 A1 | 9/2016 | Bleacher et al. | |
| 2019/0066630 A1* | 2/2019 | Fukazawa | .......... G02B 27/0172 |
| 2019/0246235 A1 | 8/2019 | Bruser et al. | |
| 2019/0281389 A1 | 9/2019 | Gordan et al. | |
| 2020/0103521 A1 | 4/2020 | Chiarella et al. | |
| 2020/0218824 A1* | 7/2020 | Chu | .................... H04L 63/0428 |

* cited by examiner

*Primary Examiner* — William A Jerez Lora
(74) *Attorney, Agent, or Firm* — Hoffman Warnick LLC

(57) ABSTRACT

Various implementations include audio devices and related computer-implemented methods for controlling playback of augmented reality (AR) audio. In some cases, a method includes: receiving a first audio notification from one of a set of applications; determining an importance value for the first audio notification; detecting an activity state of the audio device, the activity state assigned to a notification importance threshold; and either: delaying release of the first audio notification at the audio device in response to the importance value failing to meet the notification importance threshold, or releasing the first audio notification at the audio device in response to the importance value meeting or exceeding the notification importance threshold.

20 Claims, 5 Drawing Sheets

| Importance Value (Notification) | Notification Type | Notification Source (Application) |
|---|---|---|
| High | Type A | App W, App X |
| Medium | Type B, Type E | App V, App Y |
| Low | Type C, Type D | App Z |

| Activity State A (Location Type) | Activity State B (Motion) | Activity State C (Task List) | Notification Importance Threshold |
| --- | --- | --- | --- |
| Hazardous | In motion | Engaged in task | High |
| Hazard potential | At rest | Engaged in task | Medium-High |
| Safe | In motion | Engaged in task | Medium |
| Safe | In motion | Not engaged | Medium-Low |
| Safe | At rest | Not engaged | Low |

MULTI-APPLICATION AUGMENTED REALITY AUDIO WITH CONTEXTUALLY AWARE NOTIFICATIONS

TECHNICAL FIELD

This disclosure generally relates to augmented reality (AR) audio control. More particularly, the disclosure relates to audio devices and related methods for providing contextually aware AR audio notifications.

BACKGROUND

Portable electronic devices, including headphones, audio eyeglasses and other wearable audio systems are becoming more commonplace. These portable electronic devices can enable immersive user experiences, for example, using audio to augment the user's perception of the surrounding world and aid in performing a number of tasks. However, these conventional systems fail to capitalize on the various benefits that augmented reality audio can provide.

SUMMARY

All examples and features mentioned below can be combined in any technically possible way.

Various implementations include audio devices and related computer-implemented methods for controlling playback of augmented reality (AR) audio. Certain implementations include approaches for controlling AR audio notifications from a set of applications at an audio device. Additional implementations include an audio device with a control system for controlling AR audio playback of notifications from a set of applications.

In some particular aspects, a computer-implemented method of controlling playback of augmented reality (AR) audio from a set of applications at an audio device includes: receiving a first audio notification from one of the set of applications; determining an importance value for the first audio notification; detecting an activity state of the audio device, the activity state assigned to a notification importance threshold; and either: delaying release of the first audio notification at the audio device in response to the importance value failing to meet the notification importance threshold, or releasing the first audio notification at the audio device in response to the importance value meeting or exceeding the notification importance threshold.

In other particular aspects, an audio device includes: an acoustic transducer having a sound-radiating surface for providing an audio output; and a control system coupled with the acoustic transducer, the control system configured to control playback of augmented reality (AR) audio from a set of applications at the acoustic transducer by performing actions including: receiving a first audio notification from one of the set of applications; determining an importance value for the first audio notification; detecting an activity state of the audio device, the activity state assigned to a notification importance threshold; and either: delaying release of the first audio notification at the audio device in response to the importance value failing to meet the notification importance threshold, or releasing the first audio notification at the audio device in response to the importance value meeting or exceeding the notification importance threshold.

Implementations may include one of the following features, or any combination thereof.

In some cases, the method further includes running a control application at the audio device or a smart device connected with the audio device, the control application running as a gateway for notifications from the set of applications.

In certain implementations, the method further includes: receiving a user command defining a noise management feature of the audio device; and enabling the noise management feature in response to the user command, where the noise management feature is enabled while the control application is running, and where the noise management feature includes at least one of: aware mode, augmented hearing mode, active noise reduction (ANR) mode or controllable noise cancellation (CNC) mode.

In particular cases, the set of applications includes a plurality of applications.

In certain aspects, the audio device includes a wearable audio device or a speaker system.

In some cases, the method further includes: receiving a second audio notification from another one of the set of applications, the second audio notification arriving after the first audio notification; determining an importance value for the second audio notification; and releasing the second audio notification at the audio device in response to the importance value for the second audio notification meeting or exceeding the notification importance threshold.

In particular implementations, the second audio notification is released prior to the release of the first audio notification if the importance value for the second audio notification meets or exceeds the notification importance threshold and the importance value for the first audio notification fails to meet the notification importance threshold.

In certain cases, notifications from the set of applications are held in a queue awaiting release until a corresponding importance value for the notifications meets or exceeds a current notification importance threshold.

In some aspects, an activity state of the audio device is based upon one or more of: a location of the audio device, an orientation of the audio device, a relative proximity of the audio device to another audio device, an indicator about the environment proximate the audio device, detected motion of the audio device, or a task list for the user of the audio device.

In particular cases, activity states and notification importance thresholds are correlated in a relational database for look-up.

In certain aspects, notification importance thresholds are grouped into at least three categories including a low importance threshold, a medium importance threshold and a high importance threshold.

In some implementations, the control system is further configured to: run a control application at the audio device or a smart device connected with the audio device, the control application running as a gateway for notifications from the set of applications; receive a user command defining a noise management feature of the audio device; and enable the noise management feature in response to the user command, where the noise management feature is enabled while the control application is running, and where the noise management feature includes at least one of: aware mode, augmented hearing mode, active noise reduction (ANR) mode or controllable noise cancellation (CNC) mode.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

FIG. 4 shows an example table including notification importance classifications and corresponding notification types and sources according to various implementations.

FIG. 5 shows an example mapping table for defining notification importance thresholds according to various implementations.

Figure 1:
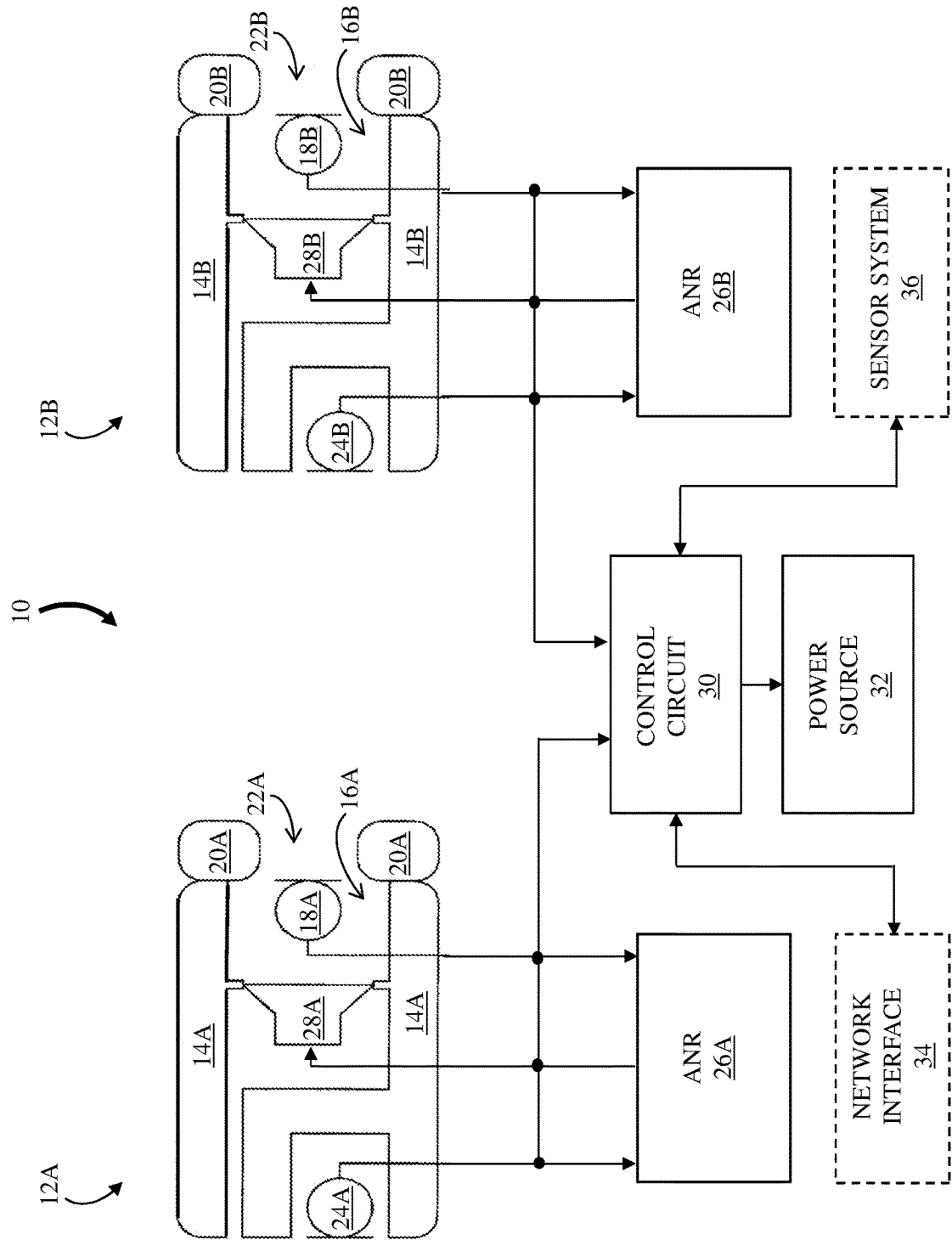
FIG. 1 is a schematic depiction of an example audio device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that application notifications can be managed in an augmented audio environment based upon the activity state of an audio device. In certain implementations, one or more audio notifications is either delayed or released at an audio device based upon a detected activity state of that audio device and an importance value of the notification(s).

Additional aspects of managing multi-application augmented reality audio notifications are described in co-pending U.S. patent application Ser. No. 16/511,375, entitled, "Multi-Application Control of Augmented Reality Audio", filed concurrently herewith on Jul. 15, 2019 and incorporated by reference in its entirety.

Commonly labeled components in the FIGURES are considered to be substantially equivalent components for the purposes of illustration, and redundant discussion of those components is omitted for clarity.

Aspects and implementations disclosed herein may be applicable to a wide variety of audio devices including personal audio devices, such as a portable speaker, headphones, and wearable audio devices in various form factors, such as watches, glasses, neck-worn speakers, helmets with integrated speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses, headphones, earphones or other head-mounted audio devices (e.g., helmets with integrated speakers).

Audio Device

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device (or simply, audio device) 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. As described herein, in addition to providing an anti-noise acoustic signal, electroacoustic transducer 28 can utilize its sound-radiating surface for providing an audio output for playback.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The audio device 10 also includes a power source 32. The control circuit 30 and power source 32 may be in one or both of the earpieces 12 or may be in a separate housing in communication with the earpieces 12. The audio device 10 may also include a network interface 34 to provide communication between the audio device 10 and one or more audio sources, other networked (e.g., wireless) speaker packages and/or other audio playback devices via one or more communications protocols. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols). Network interface 34 is shown in phantom, as portions of the interface 34 may be located remotely from audio device 10.

Additional description of the control circuit 30 (e.g., including memory and processing function), network interface 34 (e.g., including network media processor functions)

and other features of the audio device 10 can be found in U.S. patent application Ser. No. 16/179,205 ("Spatialized Virtual Personal Assistant"), filed on Nov. 2, 2018, which is herein incorporated by reference in its entirety.

As shown in FIG. 1, audio device 10 can also include a sensor system 36 coupled with control circuit 30 for detecting one or more conditions of the environment proximate audio device 10. Sensor system 36 can include inner microphones 18 and/or outer microphones 24, sensors for detecting inertial conditions at the audio device 10 and/or conditions of the environment proximate audio device 10 as described herein. The sensors may be on-board the audio device 10, or may be remote or otherwise wireless (or hard-wired) connected to the audio device 10. As described further herein, sensor system 36 can include a plurality of distinct sensor types for detecting inertial information, environmental information, or commands at the audio device 10. In particular implementations, sensor system 36 can enable detection of user movement, including movement of a user's head or other body part(s), and/or the look direction of a user. In particular, portions of sensor system 36 may incorporate one or more movement sensors, such as accelerometers gyroscopes and/or magnetometers. In some particular implementations, sensor system 36 can one or more inertial measurement units (IMUs) having three-dimensional (3D) accelerometers, gyroscopes and a magnetometer. Additionally, in various implementations, the sensor system 36 can include a barometer for detecting elevation via pressure readings, e.g., for locating the audio device 10 vertically, such as in a tall building or underground. The sensor system 36 can further include one or more biometric sensors for detecting biometric indicators about the user of the audio device 10 and/or location/proximity sensors for detecting a location of the audio device 10 and/or a relative proximity of the audio device 10 to another audio device.

In various implementations, the sensor system 36 can be located at the audio device 10, e.g., where an IMU is physically housed in the audio device 10. In some examples, the sensor system 36 (e.g., including the IMU) is configured to detect a position, or a change in position, of the audio device 10. This inertial information can be used to control various functions described herein. For example, the inertial information can be used to trigger a command function, such as activating an operating mode of the audio device 10 (e.g., multi-application AR audio mode), modifying playback of an audio file, or suggesting a distinct audio file for playback during an operating mode.

The sensor system 36 can also include one or more interface(s) for receiving commands at the audio device 10, e.g., permitting a user to initiate functions of the audio device 10. In a particular example implementation, the sensor system 36 can include, or be coupled with, a capacitive touch interface for receiving tactile commands on the audio device 10.

In other implementations, as illustrated in the phantom depiction in FIG. 1, one or more portions of the sensor system 36 can be located at another device capable of indicating inertial, location, or other information about the user of the audio device 10. For example, in some cases, the sensor system 36 can include an IMU physically housed in a hand-held device such as a pointer, or in a wearable audio device. In particular example implementations, at least one of the sensors in the sensor system 36 can be housed in a wearable audio device distinct from the audio device 10, such as where audio device 10 includes headphones and an IMU is located in a pair of glasses, a watch or other wearable electronic device.

Data Flow

Figure 2:
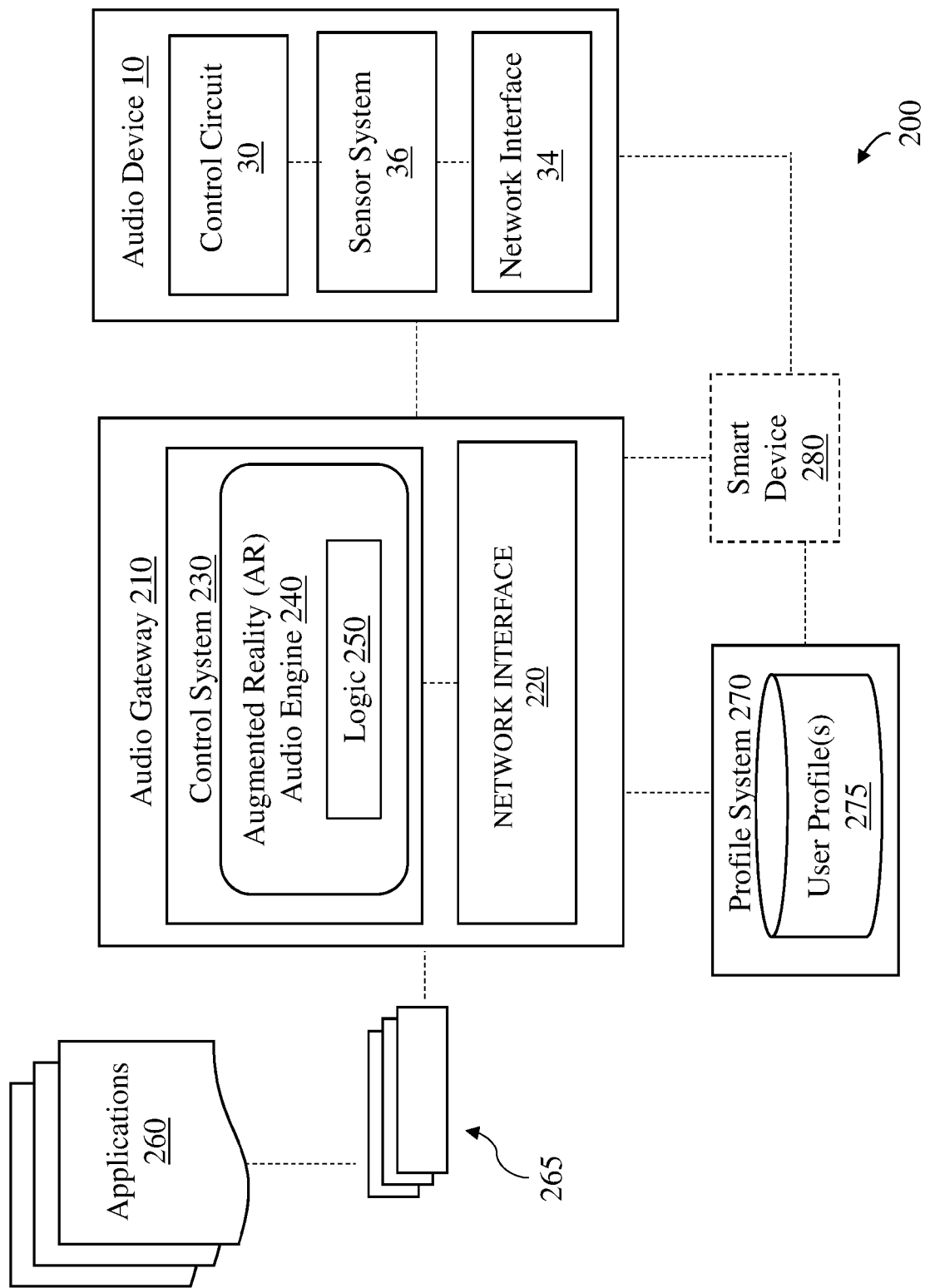
FIG. 2 is data flow diagram illustrating interaction between devices running an augmented reality audio engine in an environment according to various implementations.

As described with respect to FIG. 1, control circuit 30 can execute (and in some cases store) instructions for controlling AR audio functions in audio device 10 and/or other audio playback devices in a network of such devices. FIG. 2 shows a schematic depiction of data flows in a system 200 including the audio device 10 connected with an audio gateway device (audio gateway) 210. The audio device 10 and audio gateway 210 can be paired according to any connection described herein, e.g., a wireless connection such as Bluetooth, WiFi or Zigbee. Example configurations of an audio gateway 210 can include a cellular phone, personal data assistant (PDA), tablet, personal computer (PC), wearable communication system, or any other known audio gateway for providing audio content to audio device 10. In particular implementations, the audio gateway 210 includes a network interface 220, which can include similar network interface components as described with reference to the network interface 34 of audio device 10, e.g., a wireless transceiver configured to communicate over any wireless protocol described herein.

Audio gateway 210 can further include a control system 230 configured to execute control functions in the multi-application AR audio mode at the audio device 10. The control system 230 can include a microprocessor, memory, and other conventional control hardware/software for executing functions described herein. In some cases, control system 230 can include similar components as those described with respect to control circuit 30 in FIG. 1. In various implementations, control system 230 can have additional processing and/or storage capabilities not present at the control circuit 30 in audio device 10. However, in various implementations, actions performed by control system 230 can be executed at the control circuit 30 on audio device 10 to provide augmented reality (AR) audio functions described herein.

In particular implementations, control system 230 includes an augmented reality (AR) audio engine 240 or otherwise accesses program code for executing processes performed by AR audio engine 240 (e.g., via network interface 220). AR audio engine 240 can include logic 250 for executing functions described herein. Both audio gateway 210 and audio device 10 are shown in simplified form in FIG. 2 to focus illustration on functions described according to the AR audio engine 240. AR audio engine 240 can be configured to implement audio modifications in audio outputs at the transducer (e.g., speaker) 28 (FIG. 1) of the audio device 10 based upon audio notification rules that account for audio notification importance values and an activity state of the audio device 10, and/or in response to receiving a command from a user (e.g., via one or more microphones in the sensor system 36 or in a paired smart device).

In various particular implementations, AR audio engine 240 is configured to receive audio notification data from a set of applications, determine an importance value for the audio notifications, detect an activity state of the audio device 10, and instruct the control circuit 30 at the audio device 10 to initiate playback of AR audio (e.g., one or more notifications) at the transducer(s) 28 (FIG. 1) based upon the importance value of the notification and a notification importance threshold assigned to the activity state. In particular cases, the AR audio includes a notification from one of a plurality of distinct applications running, e.g., via the audio gateway 210 and/or the audio device 10. The AR audio engine 240 is configured to release audio notifications as audio output at the audio device 10 according to audio notification rules (e.g., accounting for the importance value of the notification and the notification importance threshold for the activity state), for example, in an order different from the order in which the notifications were received, and/or on a delay.

FIG. 2 illustrates data flows between components in system 200 (e.g., audio device 10 and audio gateway 210), as well as between those components and additional devices. It is understood that one or more components shown in the data flow diagram may be integrated in the same physical housing, e.g., in the housing of audio device 10, or may reside in one or more separate physical locations. In various implementations, the AR audio engine 240 is connected (e.g., via the audio gateway 210) with a set of applications 260, which may run locally at a given device (e.g., audio device 10 and/or smart device 280), or may be running in a cloud-based system (server) connected with that device. The AR audio engine 240 is also connected with a profile system 270 including user profiles 275. In additional implementations, the AR audio engine 240 can also be connected with a smart device 280.

In various implementations, the AR audio engine 240 runs as a control application at the audio device 10, audio gateway 210 and/or smart device 280 for notifications from the set of distinct (software) applications 260. In still further implementations, the AR audio engine 240 can run as a control application at a cloud-based or other distributed computing system (server), such as in the case that the software applications 260 are run at the same or a similar system. The AR audio engine 240 can run continuously for a period, e.g., when enabled, in order to act as a gateway for notifications 265 from those applications 260. Where the set includes a plurality of distinct applications 260, the distinct applications 260 are independent of one another, and are configured to provide notifications 265 such as user interface notifications (e.g., audio notifications, visual notifications, tactile or haptic notifications, etc.) based upon one or more conditions. For example, the distinct applications can include a calendar application providing reminders about upcoming events, an audio streaming application providing notifications about available content, a communications application providing notifications about incoming phone calls or video calls, a health monitoring application providing notifications about vital signs and/or recommending increases, decreases or other modifications to activity level based upon the vital signs, a safety monitoring application providing notifications about unsafe or otherwise hazardous areas or conditions, a workload management application providing instructions for tasks in a work environment, etc.

In particular implementations, the logic 250 in AR audio engine 240 is configured to process sensor data, contextual data, and/or user input data from the audio device 10 and/or additional sources (e.g., smart device 280, profile system 270, etc.) and execute various control functions. For example, the AR audio engine 240 is configured to receive sensor data from the sensor system 36, data from one or more applications running at the audio gateway 210 and/or the smart device 280 and/or user profile data (e.g., from profile system 270). In various implementations, the AR audio engine 240 is also configured to receive commands from a user (e.g., via one or more interfaces and/or sensors described herein, such as interfaces and/or sensors in sensor system 36 and/or a separate smart device 280). In response to determining which audio notification should be released, and at what time, the AR audio engine 240 can initiate playback (e.g., via transducer(s) 28 at audio device 10) of the audio notification(s) 265 according to the rules.

AR audio engine 240 (including logic 250, related software and/or hardware) can be located at the audio device 10, audio gateway 210 or any other device described herein (e.g., smart device 280). That is, AR audio engine 240 can be configured to execute functions at one or more devices and/or components described herein. In some cases, the AR audio engine 240 may take the form of an entirely hardware implementation, an entirely software implementation (including firmware, resident software, micro-code, etc.) or an implementation combining software and hardware aspects that may all generally be referred to herein as an "engine." Additionally, the AR audio engine 240 may take the form of a computer program product embodied in any tangible medium of expression having computer-usable program code embodied in the medium. In various particular implementations, the AR audio engine 240 executes functions described herein according to logic 250, which can be stored or otherwise accessed by any device capable of performing those functions, e.g., audio gateway 210, audio device 10 or other device(s) described herein.

User profiles 275 may be user-specific, community-specific, device-specific, location-specific or otherwise associated with a particular entity such as the user. User profiles 275 can include user-specific notification settings, audio messages stored by the user of audio device 10, or another user, or other audio content available from network audio sources coupled with network interfaces 34 and/or 220. In some cases, profile system 270 is located in a local server, or a cloud-based server, similar to any such server described herein. Profile system 270 can be associated with any community of users, e.g., employees in a workplace, a social network, subscription-based music service, etc. In particular implementations, profile system 270 can include user-specific preferences (as profiles 275) for messages and/or related notifications (e.g., prompts, audio overlays). Profiles 275 can be customized according to particular user preferences, or can be shared by users with common attributes.

In addition to the profile system 270, the AR audio engine 240 can additionally be coupled (e.g., wirelessly and/or via hardwired connections in personal audio device 10) with an audio library (not shown), which can include audio content (e.g., audio file(s), playlist(s) of audio files, podcast(s), an audio stream or an Internet radio station, location-specific audio pins, condition-specific audio files and/or streams, or one or more audibly presented selections) for playback (e.g., streaming or otherwise rendering) at audio device 10. The audio library can include any library associated with digital audio sources accessible via network interfaces 34 and/or 220 described herein, including locally stored, remotely stored or Internet-based audio libraries.

As shown herein, AR audio engine 240 can also be coupled with a separate smart device 280. The smart device 280 is shown in phantom because it may be a separate component from the device executing the AR audio engine 240, however, it is understood that in various implementations, the audio gateway 210 is located at the smart device 280. The AR audio engine 240 can have access to a user profile (e.g., profile 275) and/or biometric information about the user of audio device 10. In some cases, the AR audio engine 240 directly accesses the user profile and biometric information, however, in other cases, the AR audio engine 240 can access the user profile and/or biometric information via a separate smart device 280. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with a user, and can include one or more network interfaces for interacting with control circuit 30 and/or control system 230 and other components in audio device 10.

In some example implementations, smart device 280 can be utilized for: connecting audio device 10 to a Wi-Fi network; creating a system account for the user; setting up music and/or location-based audio services; browsing of content for playback; setting preset assignments on the audio device 10 or other audio playback devices; transport control (e.g., play/pause, fast forward/rewind, etc.) for the audio device 10; and selecting one or more audio devices 10 for content playback. Smart device 280 can further include embedded sensors for measuring biometric information about a user, e.g., travel, sleep or exercise patterns; body temperature; heart rate; or pace of gait (e.g., via accelerometer(s)). In various implementations, one or more functions of the AR audio engine 240 can be executed at smart device 280. Further, it is understood that audio gateway 210 can include any manner of smart device described herein.

As described herein, AR audio engine 240 is configured to receive sensor data about one or more activity states of the audio device 10 from sensor system 36. In various particular implementations, the sensor system 36 can include an IMU for providing inertial information about the audio device 10 to the AR audio engine 240. In various implementations, this inertial information can include orientation, translation and heading. For example, inertial information can include changes in heading (e.g., from an absolute value relative to magnetic north), changes in orientation (e.g., roll, pitch, yaw), and absolute translation (e.g., changes in x-direction, y-direction, z-direction). Additionally, inertial information can include first and second derivatives (i.e., velocity and acceleration) of these parameters. In particular examples, the AR audio engine 240, including logic 250, is configured to calculate spatially rendered audio locations proximate the audio device for audio output using inputs such as audio pin angle, IMU azimuth angle and persistent azimuth, as described in U.S. Pat. No. 10,194,259, which is hereby incorporated by reference in its entirety.

In additional implementations, sensor system 36 can include additional sensors for detecting conditions at the audio device 10, for example: a position tracking system; and a microphone (e.g., including one or more microphones). It is understood that any number of additional sensors can be incorporated in sensor system 36, and can include temperature sensors or humidity sensors for detecting changes in weather within environments, physiological sensors for detecting physiological conditions of the user optical/laser-based sensors and/or vision systems for tracking movement/speed/acceleration, light sensors for detecting time of day, additional audio sensors (e.g., microphones) for detecting human or other user speech or ambient noise, etc. These sensors are merely examples of sensor types that may be employed according to various implementations. Additional details about specific sensor types and functions, along with actuation mechanisms and cues in the audio device 10 and/or smart device 280 can be found in U.S. patent application Ser. No. 16/179,205 ("Spatialized Virtual Personal Assistant"), previously incorporated by reference herein.

In additional implementations, the AR audio engine 240 can be configured to implement modifications in audio outputs at the transducer (e.g., speaker) 28 (FIG. 1) at audio device 10 in response to receiving additional information from audio device 10 or another connected device such as audio gateway 210 and/or smart device 280. For example, a Bluetooth beacon (e.g., BLE beacon) trigger, GPS location trigger or timer/alarm mechanism can be used in evaluating rules for providing notifications at audio device 10. These triggers and mechanisms can be used in conjunction with other actuation mechanisms described herein (e.g., application data-based actuation, timing-based actuation, weather data-based actuation, voice actuation, gesture actuation, tactile actuation) to control release of notifications. In some cases, notifications can be restricted, delayed or otherwise re-ordered based upon proximity to a detected BLE beacon or GPS location. In other particular cases, the notifications can be restricted, delayed or otherwise re-ordered based upon a timing mechanism, such as at particular times or intervals.

As additionally noted herein, the AR audio engine 240 can be configured to detect or otherwise retrieve contextual data about the user and/or usage of the audio device 10. For example, the AR audio engine 240 can be configured to retrieve contextual data from one or more applications running at the audio gateway 210 and/or the audio device 10, such as a workplace management application, calendar or organizational application, e-mail or messaging application, social media application, travel application, shopping application, fitness application, etc. The AR audio engine 240 can also be configured to detect that the user is engaging one or more device functions, for example, that the user is on a phone call or actively sending/receiving messages with another user using the audio gateway 210.

As described herein, in some implementations, the AR audio engine 240 is configured to output audio notifications (as a subset of notifications 265) in spatialized form. In some cases, audio notifications can include a spatialized audio file configured for playback (which in some cases is binaural). In these cases, the spatialized audio file is configured for output at a spatially rendered audio location, or multiple spatially rendered audio locations, relative to the user. For example, the spatialized audio file can be configured for playback at one or more spatially rendered audio locations relative to the user's look direction (e.g., as detected by sensors at sensor system 36 and/or smart device 280), or relative to a physical location proximate the user. In other cases, the notification includes a monaural audio file, a stereo audio file, a spatialized audio file or a multichannel audio file. Application of spatialized audio functions in particular devices is further described in U.S. Pat. No. 10,194,259, previously incorporated by reference herein.

In particular cases, the (audio) notification 265 is output at the audio device 10 in a spatially rendered audio location that is defined relative to a look direction of the user (e.g., the user's head direction or eye focus direction) or relative to a physical location proximate the user. In additional particular implementations, the AR audio engine 240 outputs the audio notification according to an application setting, a location of the audio device 10, the look direction of the user, contextual information about what a user is doing, and/or a type of the playback condition data.

As noted herein, in various implementations, rules for releasing the notifications 265 can be settings-specific, location-specific, device-specific, time-specific, weather-specific, movement-specific, event-specific, specifically tailored to interaction with other users, or otherwise tailored to particular user experiences. In some cases, AR audio engine 240 presents a notification 265 to the user that is related to a particular location, e.g., when the user approaches that location, and can also present a notification 265 based upon the direction in which the user is facing (e.g., looking). For example, looking straight ahead, left or right can trigger the AR audio engine 240 to provide notifications 265 (in a spatially rendered audio location defined relative to the different look direction) indicating information (e.g., areas of interest) or other AR audio relevant to that look direction. In some directionally-specific cases, the notification 265 can include narrative audio such as introductory information about additional content associated with one or more look directions, e.g., as a sample.

In various particular implementations, the AR audio engine 240 is configured to control release of notifications 265 based upon an importance value for a given notification and an activity state of the audio device 10. The activity state is assigned to a notification importance threshold, such that depending upon the activity state, certain notifications 265 will be released while others will be delayed (e.g., held in a queue until a corresponding importance value meets or exceeds the notification importance threshold) or otherwise re-prioritized.

Example Process Flow

Figure 3:
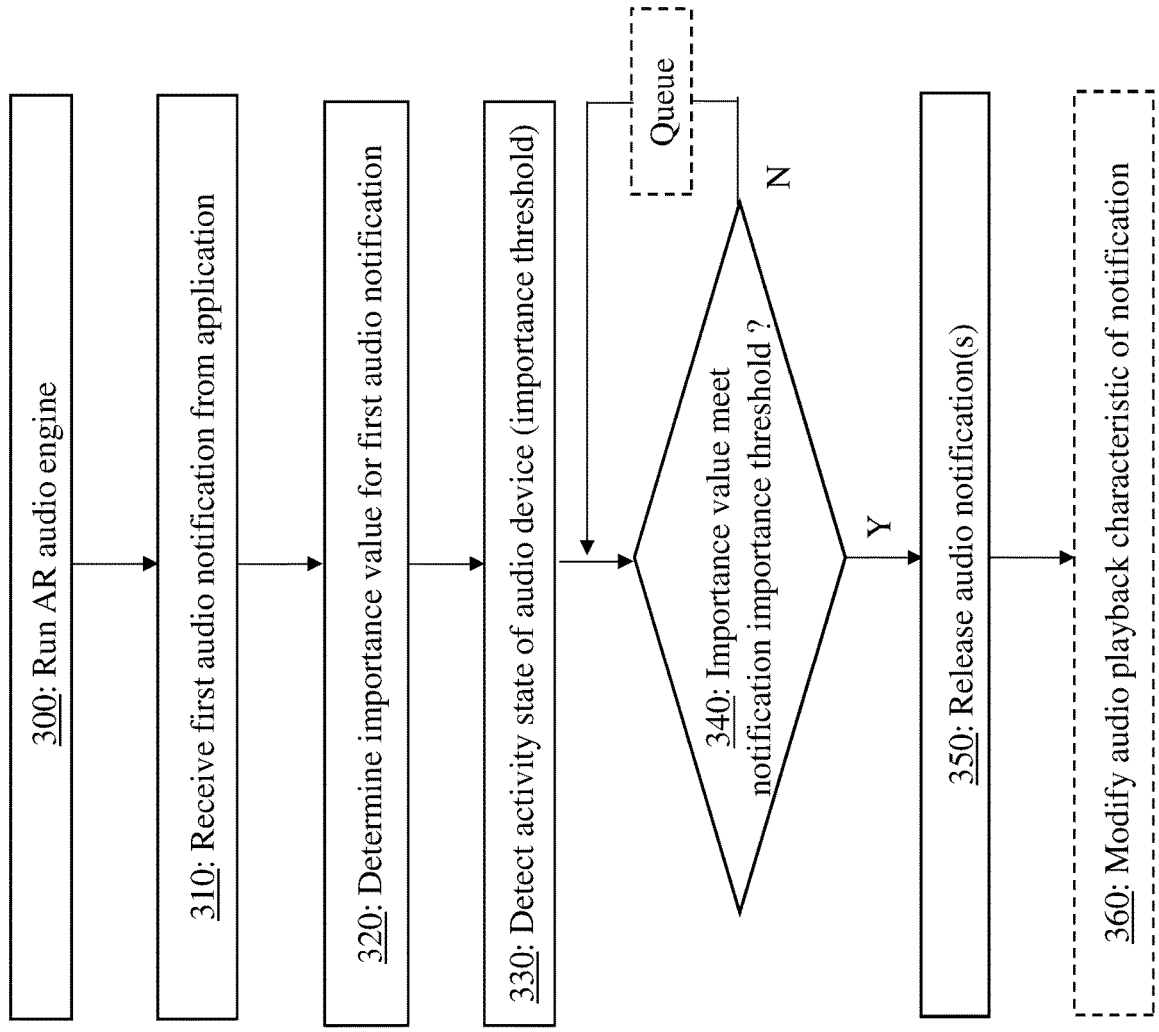
FIG. 3 is a flow diagram illustrating processes performed by the augmented reality audio engine shown in FIG. 2.

During operation, the AR audio engine 240 is configured to control playback of AR audio at the audio device 10 according to various rules. In particular implementations, the AR audio engine 240 is configured to act as a gateway for notifications 265 from distinct applications 260, releasing those notifications 265 according to a set of audio notification rules. FIG. 3 illustrates a general process flow in controlling AR audio notifications as performed by the AR audio engine 240. FIGS. 2 and 3 are referred to concurrently.

As shown, process 300 includes running the AR audio engine 240 (also referred to as a "control application") as a gateway for notifications 265 from distinct applications 260. In various implementations, the AR audio engine 240 is run (e.g., executed) at the audio device 10, audio gateway 210, smart device 280 and/or in a remote or distributed server such as a cloud-based server. In some cases, while the AR audio engine 240 is running, the other applications 260 providing notifications 265 are run in a background state. In certain implementations, the AR audio engine 240 can queue notifications 265 from applications 260, independent of the notification source (e.g., application based notifications, cloud-based notifications, etc.).

As used herein, the term "notification" can refer to an update or information that is provided, for example, based upon default settings in an application and/or user-defined settings in that application. The "audio notifications" described herein can include audio playback of text-based notifications (e.g., via text-to-speech conversion) and/or playback of audio files or streams that are originally received by the AR audio engine 240 in an audio format. The AR audio engine 240 is configured to act as a gateway for both playback of audio notifications as well as release of notifications in other formats. However, in particular cases, the AR audio engine 240 is configured to control audio notifications 265, e.g., as output at the transducers 28 on audio device 10.

In various implementations, as illustrated in process 310 in FIG. 3, the AR audio engine 240 is configured to receive a first notification 265A from an application 260A in the set of applications. In some examples, the notification 265A can include an update from a software application such as a social media application (e.g., a status update or news item such as, "Matthew has just posted a new photo", or "Ilissa shared a news story"). In other examples, the notification 265A can indicate an incoming message (e.g., "You have a message from Maya") from a messaging application or a phone call (e.g., "DonPaul is calling") via an audio gateway (e.g., audio gateway 210). The notification 265A can further include information about detected states of the audio device 10 and/or smart device 280, for example, that power is running low on one of these devices, or that the audio device 10 is in close proximity to an audio device associated with another user such as a friend or colleague. These are just several of the various notifications 265 that can be received from a plurality of applications 260.

After receiving the first notification 265A from the application (e.g., a first application 260A), the AR audio engine 240 is configured to determine an importance value for the audio notification (process 320). In various implementations, the importance value for the audio notification 265 is determined by logic 250 in the AR audio engine 240. In particular cases, the importance value for the audio notification 265 is based upon the source of the notification 265, e.g., the specific application 260 or category of application 260 from which the audio notification 265 is received. For example, notifications 265 from a social media application can be assigned a lower value (e.g., "low importance", as compared with "medium importance" or "high importance", or a score of 1 or 2 on a 5 or 10-point importance scale). In contrast, notifications 265 from a navigation application can be assigned a higher value (e.g., "medium importance" or 4-6 on a 10-point importance scale). In further contrast, notifications 265 from an emergency alert application or an employee management application can be assigned an even higher value (e.g., "high importance" or a 7-9 on a 10-point importance scale).

In certain cases, the importance value for the audio notification 265 is predefined (e.g., stored in or otherwise accessible by logic 250) and classified according to the source of the notification 265. In these cases, the AR audio engine 240 can store or otherwise access a table, model or other data structure including definitions of importance values for particular audio notifications 265, notification types, and/or notification sources (e.g., applications 260). FIG. 4 depicts an example importance value table 400 that correlates importance values of High, Medium and Low with both notification types (Types A-E) and notification sources (Applications V-Z). This example table 400 is a simplified illustration of only one such approach for storing and making accessible the importance values of notifications. It is understood that additional parameters, which may or may not be related, can be used for determining importance values for notifications. Expanding on the example of table 400, the Notification Type column and Notification Source column can be related, such that a notification type that can be sent by multiple applications is only designated with an importance value of High when it is sent from particular applications. That is, the same type of notification 265 can have distinct importance values when sent from distinct applications 260.

In some cases, notification types can be classified by the frequency with which they are received, either in a short period (e.g., a repeatedly received notification) or a longer period (e.g., over device usage duration such as a matter of days or weeks). Notification types can also account for code or other data sent with the notification 265 that indicates the level of urgency that the corresponding application 260 assigns the notification 265. For example, one or more applications 260 can indicate the urgency of its notifications 265 relative to other notifications from that application. One example can include a social media application designating a security breach of its profile system as an urgent notification. This may be the most urgent notification type that the social media application can send. However, the AR audio engine 240 may designate all notifications from that social media application (or categories of social media applications) as no greater than Medium or Low importance values (e.g., an importance ceiling). In contrast, the AR audio engine 240 may designate all notifications from a workplace management application as no less than Medium importance values (e.g., an importance floor). In these cases, the importance value of a particular notification can be defined based upon multiple characteristics of that notification.

In additional implementations, the logic 250 in the AR audio engine 240 includes pattern recognition logic and/or a machine learning engine for ranking or otherwise prioritizing notifications 265 using feedback data from a community of users. For example, the AR audio engine 240 can be configured to receive data indicating which notifications 265 are actuated by one or more users (e.g., opened, or actively played) or otherwise allowed to play by the user (e.g., not rejected by one or more users). The AR audio engine 240 can be configured to increase a priority or ranking of that notification 265 (or that type and/or category of notification 265) for at least one additional user (e.g., in a group of users) based upon the received feedback data about the notification(s) 265. This logic 250 can be refined periodically and/or on a continuous basis to update rules for releasing notifications 265 based upon notification actuation and/or release by a group of users.

Approximately concurrently with, or after, determining the importance value of the audio notification 265, the AR audio engine 240 is configured to detect an activity state of the audio device 10 (process 330, FIG. 3). As noted herein, the AR audio engine 240 is executed as a software application configured to receive data from one or more systems and/or applications on the audio device 10, audio gateway 210 and/or smart device 280. In particular cases, the AR audio engine 240 receives sensor data about the activity state of the audio device 10 from the sensor system 36, e.g., IMU data, GPS data, voice signature data. The AR audio engine 240 can also access user profiles 275, which can include playback condition thresholds or other standards specific to the user. In some examples, the AR audio engine 240 can be configured to receive application execution data from an application running at the audio device 10, audio gateway 210 or the smart device 280. The application execution data can be received from one or more applications, e.g., a workplace management application, a fitness application, a navigation application, a social media application, a news application, etc.

In some implementations, the AR audio engine 240 detects activity state data, such as data about one or more of: a location of the audio device 10 (e.g., geographic location provided by a GPS sensor or elevation provided by a geolocation system or network triangulation location), an orientation of the audio device 10 (e.g., as detected by an IMU or an optical sensor), a relative proximity of the audio device 10 to another audio device (e.g., using GPS sensor(s), network connectivity range such as Bluetooth range or other P2P range systems, optical sensors, or acoustic sensors detecting the voice of the other audio device's user), an indicator about the environment proximate the audio device 10 (e.g., weather conditions as detected by a humidity sensor or air quality as detected by an air quality sensor), detected motion of the audio device 10 (e.g., detecting that a user is running using the IMU, or that the user is driving a vehicle using GPS information, or that the user is approaching an obstacle using optical sensors, etc.), or a task list for the user of the audio device 10 (e.g., as provided by application execution data, such as a workplace management application, fitness application or collaborative task management application).

In any case, the AR audio engine 240 is configured to detect the activity state of the audio device 10. In various implementations, one or more activity states can be assigned to a notification importance threshold. In this sense, the detected activity state of the audio device 10 can be used to filter notifications 265 received from applications 260 based upon the importance value of the notification 265, and the corresponding notification importance threshold for the detected activity state. In some cases, the logic 250 in AR audio engine 240 additionally includes mappings between the detected activity state of the audio device 10 and the notification importance thresholds. In some cases, these mappings include a relational database, a lookup table, a data model, a machine learning engine, etc. Similar to the example of the importance values depicted in table 400 (FIG. 4), notification importance thresholds can be grouped into categories, e.g., low, medium and high importance thresholds, numerical or graded importance thresholds, threshold scales, etc. In particular cases, the notification importance thresholds correspond with the categories of importance values for the notifications 265.

FIG. 5 depicts a generalized example table 500 showing mappings between activity states and notification importance thresholds. Table 500 is merely one example of mappings that can be used to look up or otherwise determine the notification importance threshold for notifications 265 based upon the detected activity state of the audio device 10. This table illustrates three example activity states: Location Type (e.g., hazardous location, potentially hazardous location, safe location, etc.); Motion, as detected (e.g., in motion, at rest, transitioning, etc.); and Task List (e.g., engaged in a task, not engaged in a task, task upcoming, etc.). These are general examples of mappings between notification importance thresholds and one or more indicators of activity state for the audio device 10, and additional (or fewer) activity state inputs can be factored into determining notification importance thresholds in various implementations. Even further, the mappings can be adjusted according to factors that are not necessarily categorized as activity states, e.g., time of day, day of the week, type of audio device 10, or industry usage. For example, the audio device 10 or audio gateway 210 can be loaded with a software program such as the AR audio engine 240 that has preset mappings for notification importance thresholds and activity states. These mappings can be adjusted (e.g., in application settings or via a control application such as a workplace management application) according to particular use cases. Where the audio device 10 is intended for use by employees in a manufacturing environment or an industrial facility, the mappings can be adjusted or otherwise set to reflect preferences for those use cases (e.g., in a clean room setting, on board an oil rig, or on an elevated construction platform).

Returning to FIG. 3, following detection of the activity state of the audio device 10, the process follows to decision 340. In response to detecting an audio notification 265 having an importance value that meets or exceeds a notification importance threshold, that notification is released for playback at the transducers (e.g., transducer 28 at audio device 10), as shown in process 350. Using the example tables 400 and 500 in FIGS. 4 and 5, respectively, notification type A (with high importance value) shown in table 400 would meet or exceed the notification importance thresholds shown in table 500 for all of the activity state indicators in FIG. 5. In contrast, notification types B and E would only meet or exceed the notification importance thresholds for scenarios where the location type is indicated as "Safe" in FIG. 5.

With continuing reference to FIG. 3, if the importance value of the notification 265 does not meet the applicable notification importance threshold (No to decision 340), the AR audio engine 240 checks the importance value of the notification 265 against the notification importance threshold again, e.g., iteratively or until the notification becomes stale or times out. This is reflected in the loop back to decision 340. In some cases, the activity state of the audio device 10 is updated over time, e.g., where the location of the audio device 10 changes, the nature of the environment around the audio device 10 changes, items on a task list are completed, etc. As such, a notification 265 that does not meet the notification importance threshold at a given time can later meet that threshold when the activity state of the audio device 10 changes (and is released for playback).

Even further, as noted herein, the mappings between activity states and notification importance thresholds can be adjusted where rules-based condition data changes, e.g., as the date and time change, calendar events change, physiological conditions of the user change, use context changes (e.g., from work use to personal use), etc. As such, a notification 265 that does not meet the notification importance threshold at a given time can later be released when importance thresholds change or are no longer applicable. In this sense, where a notification 265 is not released for playback, that notification 265 can be re-checked against updated notification importance thresholds.

In some cases, notifications 265 that do not meet or exceed a notification importance threshold are held in a queue (shown in phantom) before re-checking against the thresholds. In various implementations, the notifications held in the queue are released on a delay, e.g., based upon one or more notification release rules. In some cases, the queue can re-order notifications 265 from their order received based upon the notification release rules. Examples of such rules are described in co-pending U.S. patent application (Ser. No. 16/511,375), entitled, "Multi-Application Control of Augmented Reality Audio", previously incorporated by reference herein.

In additional implementations, a machine learning-based classifier is used for mapping notification importance thresholds and importance values for notifications 265, for example, a classifier that is trained to identify whether a notification should be presented based upon input data available at a given time. In other examples, audio notification rules are updated based upon detected contextual data over time. For example, audio notification rules can be defined and/or refined based upon the user reaction to prior notifications (e.g., warning notifications), e.g., by consistently ignoring such notifications or only taking action in response to notifications in a particular format. Additional contextual data, as described herein, can be used to define and/or refine these rules.

In the examples described herein, controlling (e.g., delaying or otherwise re-ordering) release of audio notifications 265 based upon the detected activity state of the audio device 10 can allow users, managers, application developers, etc. to tailor delivery of notifications for particular use cases. For example, the AR audio engine 240 can include workplace management functions for delaying release of notifications 265 from particular applications (e.g., social media applications during) during working hours or under particular conditions (e.g., where the user is involved in a task). The AR audio engine 240 can further delay release of non-urgent notifications when the user is in a precarious position, or in a hazardous area. In other cases, the AR audio engine 240 can release notifications 265 from applications such as fitness applications or health monitoring applications while the activity state indicates that the user is moving (e.g., walking or running). These notification importance controls can allow the user to remain engaged in his/her current task or activity while still receiving audio notifications of significance.

Additional AR Audio Functions

In various implementations, as noted herein, the AR audio engine 240 is configured to manage AR audio notifications 265 according to one or more rules, e.g., user-defined rules for prioritizing one or more types of notifications 265 or types of applications releasing notifications 265 over others, limiting a number of notification-based audio interruptions in a given period or within a given geographic range and/or limiting notifications 265 when multiple AR audio notifications 265 are available. These user-defined preferences can be referred to as "tags" in some cases. While the AR audio engine 240 is configured to provide responsive, immersive audio experiences in a variety of environments, the AR audio engine 240 is also configurable to minimize intrusion into the user's other auditory experiences. Additional details of such rules are described in co-pending U.S. patent application (Ser. No. 16/511,375) entitled, "Multi-Application Control of Augmented Reality Audio", previously incorporated by reference herein.

In various implementations, as described herein, one or more audio notifications 265 are released for playback at the audio device 10 after evaluation relative to the audio notification rules. In additional implementations, as shown optionally in the flow diagram of FIG. 3 (process 360), the AR audio engine 240 can also be configured to modify an audio playback characteristic of the audio notification(s) 265 based upon the audio notification rules. For example, modifying the audio playback characteristic of the audio notification(s) 265 can include at least one of: a) prepending a tone indicating the audio notification, b) adjusting a pitch of the audio notification, c) adjusting a spatialized audio characteristic of the audio notification, or d) initiating a haptic marker prior to playback of the audio notification. In these cases, modifying the audio playback characteristic can provide a contextual cue for the user about the notification 265. That is, particular types of notifications 265 can be assigned different playback characteristics in order to indicate the source and/or importance of those notifications 265.

In some cases, audio notifications 265 from a particular application 260 can be prepended with a particular tone indicating the source of the notification 265. Similarly, audio notifications with high, medium, or low importance values can be prepended with a tone indicating that level of importance. Haptic markers can be used in conjunction with a prepended tone, or as an alternative to indicating a characteristic of the notification 265 and/or the source (e.g., the application 260). In some cases, haptic markers can include vibrations or pulses (e.g., in patterns) at the audio device 10 and/or the smart device 280 to differentiate notifications 265. In other cases, the pitch of the audio notification 265 can be adjusted to indicate the source (e.g., the type of application 260, or an identity of an originating messenger such as a contact). In still other cases, spatialized audio characteristics of the notification 265 can be adjusted based upon the audio notification rules, e.g., particular types of notifications (e.g., high-importance value notifications) can be presented in spatialized form as audio playback appearing to come from in front of the user. Other notifications (e.g., low importance value notifications) can be presented in spatialized form as audio playback appearing to come from behind the user.

In still other implementations, the control system 230 is configured to receive a user command defining a noise management feature of the audio device 10, and enable the noise management feature in response to the user command. In some cases, noise management features can include at least one of: aware mode (permitting ambient acoustic signals to pass through the transducers as though the user were not wearing the audio device 10), augmented hearing mode (enhancing ambient acoustic signals), ANR mode or CNC mode. In these cases, the user may turn on the noise management feature while the AR audio engine 240 is running.

In some additional implementations, the AR audio engine 240 is configured to control additional device functions at the audio device 10 in order to provide an immersive AR audio experience. For example, the AR audio engine 240 can be configured to activate a noise canceling function (e.g., via ANR circuit 26) on the audio device 10 during playback of the AR audio. In some cases, the AR audio engine 240 is configured to activate noise canceling functions based upon settings defined by the user or default settings for the AR audio engine 240. In these cases, the user can define settings (e.g., via profile 275, FIG. 2) for noise cancelling, such that he/she may request ANR for playback in an area where the ambient noise level exceeds a threshold, or where a particular type of audio is played back (e.g., task-based instructions, versus music, versus audio book, versus podcast). The AR audio engine 240 is configured to activate the ANR circuit 26 to cancel ambient noise and/or adjust the level of noise cancellation with CNC according to these settings.

While described in some implementations as including a wearable audio device, the audio device 10 can also include a fixed or portable speaker system in other implementations. In these cases, the speaker system can benefit from the various activity state-based notification controls described according any implementation herein. In certain cases, where the speaker system is assigned to a location, e.g., by being physically placed (e.g., fixed) in that location or associated with that location (e.g., designated at that location by a network name or other identifier such as "Conference Room Speaker" or "Workshop"), the location activity state can be fixed. Additionally, in cases where a speaker system is associated with a location, that speaker system can be assigned notification importance thresholds based upon the location and/or the identification (or classification) of people frequenting that location (e.g., the identification of people stationed at the location in a workspace).

While notification importance thresholds can be defined in the logic 250 of the AR audio engine 240, in some cases, these thresholds can be adjusted or otherwise overridden by one or more users, managers, supervisors, etc. In the instance of a workplace management application, a user or supervisor can override notification importance settings in the logic 250, e.g., by adjusting notification importance thresholds, defining new notification importance thresholds or removing current notification importance thresholds.

Additional details and examples related to the user experience in the augmented audio environment are described in the following patent applications, each of which is herein incorporated by reference in its entirety: U.S. patent application Ser. No. 16/267,643 ("Location-Based Personal Audio"); U.S. patent application Ser. No. 16/179,205 ("Spatialized Virtual Personal Assistant"); U.S. patent application Ser. No. 16/289,932 ("Augmented Audio Development"); and U.S. patent application Ser. No. 16/289,940 ("Augmented Reality Audio Playback Control").

As described herein, the AR audio engine 240 can have the technical effect of managing audio notifications for a user, e.g., a user of an audio device 10 such as a wearable audio device or a speaker system. In various implementations, the AR audio engine 240 allows the audio device user to receive notifications of a particular importance based upon the device's activity state, e.g., so as to limit unwanted notifications and prioritize more relevant notifications. As noted herein, the audio notifications 265 can be presented in a purely audio form, that is, as audio playback at transducers such as transducers 28 on the audio device 10. These audio notifications 265 can allow the user to receive information, perform tasks and make commands with his/her hands free and head up. That is, the user can be more aware of his/her surroundings as compared with conventional notification management protocols that rely upon managing notifications on a visual display or screen. The AR audio engine 240 can significantly enhance the user experience when compared with these conventional notification management protocols.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling playback of augmented reality (AR) audio from a set of applications at an audio device, the method comprising:
running a control application at the audio device or a smart device connected with the audio device, the control application running as a gateway for notifications from the set of applications;
receiving a first audio notification from one of the set of applications;
determining an importance value for the first audio notification;
detecting an activity state of the audio device, the activity state assigned to a notification importance threshold;
either:
delaying release of the first audio notification at the audio device in response to the importance value failing to meet the notification importance threshold, or
releasing the first audio notification at the audio device in response to the importance value meeting or exceeding the notification importance threshold;
receiving a user command defining a noise management feature of the audio device; and
enabling the noise management feature in response to the user command,
wherein the noise management feature is enabled while the control application is running, and
wherein the noise management feature comprises at least one of: aware mode, augmented hearing mode, active noise reduction (ANR) mode or controllable noise cancellation (CNC) mode.

2. The method of claim 1, wherein the set of applications comprises a plurality of applications.

3. The method of claim 1, wherein the audio device comprises a wearable audio device or a speaker system.

4. The method of claim 1, further comprising
receiving a second audio notification from another one of the set of applications, the second audio notification arriving after the first audio notification;
determining an importance value for the second audio notification; and
releasing the second audio notification at the audio device in response to the importance value for the second audio notification meeting or exceeding the notification importance threshold.

5. The method of claim 4, wherein the second audio notification is released prior to the release of the first audio notification if the importance value for the second audio notification meets or exceeds the notification importance threshold and the importance value for the first audio notification fails to meet the notification importance threshold.

6. The method of claim 5, wherein notifications from the set of applications are held in a queue awaiting release until a corresponding importance value for the notifications meets or exceeds a current notification importance threshold.

7. The method of claim 1, wherein an activity state of the audio device is based upon one or more of:
a location of the audio device, an orientation of the audio device, a relative proximity of the audio device to another audio device, an indicator about the environment proximate the audio device, detected motion of the audio device, or a task list for the user of the audio device.

8. The method of claim 1, wherein activity states and notification importance thresholds are correlated in a relational database for look-up.

9. The method of claim 8, wherein notification importance thresholds are grouped into at least three categories including a low importance threshold, a medium importance threshold and a high importance threshold.

10. An audio device comprising:
an acoustic transducer having a sound-radiating surface for providing an audio output; and
a control system coupled with the acoustic transducer, the control system configured to control playback of augmented reality (AR) audio from a set of applications at the acoustic transducer by performing actions comprising:
receiving a first audio notification from one of the set of applications;
determining an importance value for the first audio notification;
detecting an activity state of the audio device, the activity state assigned to a notification importance threshold;
either:
delaying release of the first audio notification at the audio device in response to the importance value failing to meet the notification importance threshold, or
releasing the first audio notification at the audio device in response to the importance value meeting or exceeding the notification importance threshold;
receiving a second audio notification from another one of the set of applications, the second audio notification arriving after the first audio notification;
determining an importance value for the second audio notification; and
releasing the second audio notification at the audio device in response to the importance value for the second audio notification meeting or exceeding the notification importance threshold,
wherein the second audio notification is released prior to the release of the first audio notification if the importance value for the second audio notification meets or exceeds the notification importance threshold and the importance value for the first audio notification fails to meet the notification importance threshold, wherein notifications from the set of applications are held in a queue awaiting release until a corresponding importance value for the notifications meets or exceeds a current notification importance threshold.

11. The audio device of claim 10, wherein the control system is further configured to:
run a control application at the audio device or a smart device connected with the audio device, the control application running as a gateway for notifications from the set of applications;
receive a user command defining a noise management feature of the audio device; and
enable the noise management feature in response to the user command,
wherein the noise management feature is enabled while the control application is running, and
wherein the noise management feature comprises at least one of: aware mode, augmented hearing mode, active noise reduction (ANR) mode or controllable noise cancellation (CNC) mode.

12. The audio device of claim 10, wherein the set of applications comprises a plurality of applications, and wherein the audio device comprises a wearable audio device or a speaker system.

13. The audio device of claim 10, wherein an activity state of the audio device is based upon one or more of:
a location of the audio device, an orientation of the audio device, a relative proximity of the audio device to another audio device, an indicator about the environment proximate the audio device, detected motion of the audio device, or a task list for the user of the audio device.

14. The audio device of claim 10, wherein activity states and notification importance thresholds are correlated in a relational database for look-up.

15. The audio device of claim 14, wherein notification importance thresholds are grouped into at least three categories including a low importance threshold, a medium importance threshold and a high importance threshold.

16. A computer-implemented method of controlling playback of augmented reality (AR) audio from a set of applications at an audio device, the method comprising:
receiving a first audio notification from one of the set of applications;
determining an importance value for the first audio notification;
detecting an activity state of the audio device, the activity state assigned to a notification importance threshold;
either:
delaying release of the first audio notification at the audio device in response to the importance value failing to meet the notification importance threshold, or
releasing the first audio notification at the audio device in response to the importance value meeting or exceeding the notification importance threshold;
receiving a second audio notification from another one of the set of applications, the second audio notification arriving after the first audio notification;
determining an importance value for the second audio notification; and
releasing the second audio notification at the audio device in response to the importance value for the second audio notification meeting or exceeding the notification importance threshold,
wherein the second audio notification is released prior to the release of the first audio notification if the importance value for the second audio notification meets or exceeds the notification importance threshold and the importance value for the first audio notification fails to meet the notification importance threshold, and wherein notifications from the set of applications are held in a queue awaiting release until a corresponding importance value for the notifications meets or exceeds a current notification importance threshold.

17. The method of claim 16, wherein an activity state of the audio device is based upon one or more of:
a location of the audio device, an orientation of the audio device, a relative proximity of the audio device to another audio device, an indicator about the environment proximate the audio device, detected motion of the audio device, or a task list for the user of the audio device.

18. The method of claim 16, wherein activity states and notification importance thresholds are correlated in a relational database for look-up.

19. An audio device comprising:
an acoustic transducer having a sound-radiating surface for providing an audio output; and
a control system coupled with the acoustic transducer, the control system configured to control playback of augmented reality (AR) audio from a set of applications at the acoustic transducer by performing actions comprising:
running a control application at the audio device or a smart device connected with the audio device, the control application running as a gateway for notifications from the set of applications;
receiving a first audio notification from one of the set of applications;
determining an importance value for the first audio notification;
detecting an activity state of the audio device, the activity state assigned to a notification importance threshold;
either:
delaying release of the first audio notification at the audio device in response to the importance value failing to meet the notification importance threshold, or
releasing the first audio notification at the audio device in response to the importance value meeting or exceeding the notification importance threshold;
receiving a user command defining a noise management feature of the audio device; and
enable the noise management feature in response to the user command,
wherein the noise management feature is enabled while the control application is running, and wherein the noise management feature comprises at least one of: aware mode, augmented hearing mode, active noise reduction (ANR) mode or controllable noise cancellation (CNC) mode.

20. The audio device of claim 19, wherein the set of applications comprises a plurality of applications, and wherein the audio device comprises a wearable audio device or a speaker system.

* * * * *